United States Patent
Polidar et al.

(10) Patent No.: US 12,428,556 B2
(45) Date of Patent: Sep. 30, 2025

(54) USE OF AN ADDITIVE COMPOSITION FOR THE CONTROLLED ACCELERATED DECOMPOSITION OF CONDENSATION POLYMERS

(71) Applicant: FRAUNHOFER-GESELLSCHAFT ZUR FÖRDERUNG DER ANGEWANDTEN FORSCHUNG E. V., Munich (DE)

(72) Inventors: Matthias Polidar, Darmstadt (DE); Elke Metzsch-Zilligen, Darmstadt (DE); Rudolf Pfaendner, Darmstadt (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/423,800

(22) PCT Filed: Jan. 17, 2020

(86) PCT No.: PCT/EP2020/000019
§ 371 (c)(1),
(2) Date: Jul. 16, 2021

(87) PCT Pub. No.: WO2020/148089
PCT Pub. Date: Jul. 23, 2020

(65) Prior Publication Data
US 2022/0073734 A1    Mar. 10, 2022

(30) Foreign Application Priority Data

Jan. 17, 2019    (DE) .................... 10 2019 200 596.9

(51) Int. Cl.
| | | |
|---|---|---|
| C08L 67/04 | (2006.01) | |
| C08K 5/053 | (2006.01) | |
| C08K 5/524 | (2006.01) | |
| C08K 5/527 | (2006.01) | |

(52) U.S. Cl.
CPC .............. C08L 67/04 (2013.01); C08K 5/053 (2013.01); C08K 5/524 (2013.01); C08K 5/527 (2013.01); *C08L 2201/06* (2013.01)

(58) Field of Classification Search
CPC ..... C08L 67/04; C08L 2201/06; C08K 5/053; C08K 5/524; C08K 5/527
See application file for complete search history.

(56) References Cited

U.S. PATENT DOCUMENTS

| | | |
|---|---|---|
| 10,138,354 B2 | 11/2018 | Groos et al. |
| 10,214,631 B2 | 2/2019 | Pfaendner et al. |
| 10,323,136 B2 | 6/2019 | Pfaendner et al. |
| 10,364,340 B2 | 7/2019 | Pfaendner et al. |
| 10,370,537 B2 | 8/2019 | Pfaendner et al. |
| 10,392,505 B2 | 8/2019 | Tojo et al. |
| 10,450,442 B2 | 10/2019 | Pfaendner et al. |
| 10,544,284 B2 | 1/2020 | Pfaendner et al. |
| 10,781,296 B2 | 9/2020 | Groos et al. |
| 10,913,743 B2 | 2/2021 | Pfaendner et al. |
| 11,292,859 B2 | 4/2022 | Klein et al. |
| 11,407,720 B2 | 8/2022 | Fischer et al. |
| 11,591,450 B2 | 2/2023 | Pfaendner et al. |
| 11,634,560 B2 | 4/2023 | Ciesielski et al. |
| 2005/0027053 A1* | 2/2005 | Uchiumi ................. C08L 29/04 524/404 |
| 2006/0177669 A1* | 8/2006 | Yamana ............. C08G 18/4854 428/423.1 |
| 2006/0293416 A1 | 12/2006 | Peeters et al. |
| 2012/0088875 A1* | 4/2012 | Kimmura ............... C08K 5/526 524/291 |
| 2013/0041086 A1 | 2/2013 | Kimura et al. |
| 2014/0343200 A1 | 11/2014 | Takimoto et al. |
| 2014/0360728 A1 | 12/2014 | Tashiro et al. |
| 2016/0052927 A1 | 2/2016 | Pfaendner et al. |
| 2016/0115299 A1* | 4/2016 | David .................. C08K 5/5419 524/101 |
| 2016/0272789 A1 | 9/2016 | Pfaendner et al. |
| 2017/0107375 A1 | 4/2017 | Pfaendner et al. |
| 2017/0121499 A1 | 5/2017 | Pfaendner et al. |

(Continued)

FOREIGN PATENT DOCUMENTS

| | | |
|---|---|---|
| CN | 1262691 A | 8/2000 |
| CN | 103408827 A | 11/2013 |
| CN | 104093783 A | 10/2014 |
| CN | 105949763 A | 9/2016 |
| DE | 102017217312 A1 | 3/2019 |
| EP | 0 987 276 A1 | 3/2000 |

(Continued)

OTHER PUBLICATIONS

English machine translation of JP 2012-107092A (Year: 2012).*

(Continued)

*Primary Examiner* — John E Uselding
(74) *Attorney, Agent, or Firm* — Leydig, Voit & Mayer, Ltd.

(57) ABSTRACT

Disclosed is the use of a mixture consisting of at least one aliphatic or cycloaliphatic polyol, in particular one adlitol or cyclitol, and at least one organic phosphorus compound under protic conditions as an additive that catalyzes the hydrolysis of condensation polymers. Also disclosed is a condensation polymer composition which contains at least one aliphatic or cycloaliphatic polyol, at least one organic phosphorus compound and at least one condensation polymer. Further disclosed is a molding compound or a molded part that can be produced from the condensation polymer composition. A method for producing the condensation polymer composition is also disclosed.

13 Claims, No Drawings

(56) References Cited

U.S. PATENT DOCUMENTS

| | | |
|---|---|---|
| 2017/0260362 A1 | 9/2017 | Pfaendner et al. |
| 2017/0260363 A1 | 9/2017 | Pfaendner et al. |
| 2017/0260366 A1 | 9/2017 | Pfaendner et al. |
| 2017/0267835 A1 | 9/2017 | Groos et al. |
| 2018/0186970 A1 | 7/2018 | Groos et al. |
| 2019/0062547 A1 | 2/2019 | Tojo et al. |
| 2019/0248927 A1 | 8/2019 | Klein et al. |
| 2020/0231783 A1 | 7/2020 | Pfaendner et al. |
| 2020/0317886 A1 | 10/2020 | Pfaendner et al. |
| 2020/0361879 A1 | 11/2020 | Fischer et al. |
| 2021/0130582 A1 | 5/2021 | Ciesielski et al. |
| 2021/0388176 A1 | 12/2021 | Metzsch-Zilligen et al. |
| 2022/0073734 A1 | 3/2022 | Polidar et al. |
| 2022/0119624 A1 | 4/2022 | Pfaendner et al. |
| 2022/0162422 A1 | 5/2022 | Pfaendner |
| 2022/0267568 A1 | 8/2022 | Pfaendner |
| 2022/0340717 A1 | 10/2022 | Olschewski et al. |
| 2023/0117792 A1 | 4/2023 | Pfaendner et al. |
| 2023/0119120 A1 | 4/2023 | Pfaendner et al. |

FOREIGN PATENT DOCUMENTS

| | | |
|---|---|---|
| EP | 2 423 251 A1 | 2/2012 |
| EP | 2 558 737 A1 | 2/2013 |
| JP | 2002-543261 A | 12/2002 |
| JP | 2009-132851 A | 6/2009 |
| JP | 2010-270311 A | 12/2010 |
| JP | 2011-236401 A | 11/2011 |
| JP | 2012-107092 A | 6/2012 |
| JP | 2012-107180 A | 6/2012 |
| JP | 2014-525506 A | 9/2014 |
| JP | 2015-071714 A | 4/2015 |
| WO | WO 1994/07949 A1 | 4/1994 |
| WO | WO 00/66659 A1 | 11/2000 |
| WO | WO 2005/063037 A1 | 7/2005 |
| WO | WO 2010/000638 A1 | 1/2010 |
| WO | WO 2011/127979 A1 | 10/2011 |
| WO | WO 2013/033287 A2 | 3/2013 |
| WO | WO 2014/022197 A1 | 2/2014 |
| WO | WO 2015/166896 A1 | 11/2015 |
| WO | WO 2017/025431 A1 | 2/2017 |
| WO | WO 2017/073623 A1 | 5/2017 |

OTHER PUBLICATIONS

Van den Oever et al. Agrofibre reinforced poly(lactic acid) composites: Effect of moisture on degradation and mechanical properties. Composites: Part A (2010) 1628-1635. (Year: 2010).*

German Patent Office, Examination Report in German Patent Application No. 10 2019 200 596.9 (Jun. 7, 2019).

European Patent Office, International Search Report in International Application No. PCT/EP2020/000019 (Apr. 29, 2020).

European Patent Office, Written Opinion in International Application No. PCT/EP2020/000019 (Apr. 29, 2020).

International Bureau of WIPO, International Preliminary Report on Patentability in International Application No. PCT/EP2020/000019 (Jun. 16, 2021).

Japan Patent Office, Notice of Reasons for Refusal in Japanese Patent Application No. 2021-541116 (Mar. 28, 2023).

China National Intellectual Property Administration, Second Office Action issued in Chinese Patent Application No. 202080009650.6 (May 13, 2023).

U.S. Appl. No. 14/442,606, filed May 13, 2015.
U.S. Appl. No. 14/779,849, filed Sep. 24, 2015.
U.S. Appl. No. 15/311,674, filed Nov. 16, 2016.
U.S. Appl. No. 15/317,899, filed Dec. 9, 2016.
U.S. Appl. No. 15/511,410, filed Mar. 15, 2017.
U.S. Appl. No. 15/511,471, filed Mar. 15, 2017.
U.S. Appl. No. 15/511,445, filed Mar. 15, 2017.
U.S. Appl. No. 15/529,026, filed May 23, 2017.
U.S. Appl. No. 15/738,515, filed Dec. 20, 2017.
U.S. Appl. No. 16/344,830, filed Apr. 25, 2019.
U.S. Appl. No. 16/488,902, filed Aug. 26, 2019.
U.S. Appl. No. 16/633,645, filed Jan. 24, 2020.
U.S. Appl. No. 16/649,656, filed Mar. 22, 2020.
U.S. Appl. No. 16/764,291, filed May 14, 2020.
U.S. Appl. No. 17/287,079, filed Apr. 20, 2021.
U.S. Appl. No. 17/425,267, filed Jul. 22, 2021.
U.S. Appl. No. 17/441,626, filed Sep. 21, 2021.

Elsawy et al., "Hydrolytic degradation of polylactic acid (PLA) and its composites," *Renewable and Sustainable Energy Reviews* 79: 1346-1352 (2017).

Georgiopoulos et al., "The effect of silica nanoparticles on the thermomechanical properties and degradation behavior of polylactic acid," *Journal of Biomaterials Applications* 29(5): 662-674 (2014).

Göpferich et al., "Mechanisms of polymer degradation and erosion," *Biomaterials* 17(2): 103-114 (1996).

Pattanasuttichonlakul et al., "Accelerating biodegradation of PLA using microbial consortium from dairy wastewater sludge combined with PLA-degrading bacterium," *International Biodeterioration & Biodegradation* 132: 74-83 (2018).

Wang et al., "Accelerated hydrolytic degradation of poly(lactic acid) achieved by adding poly(butylene succinate)," *Polymer Bulletin* 73(4): 1067-1083 (2016).

China National Intellectual Property Administration, Third Office Action issued in Chinese Patent Application No. 202080009650.6 (Mar. 28, 2024).

* cited by examiner

USE OF AN ADDITIVE COMPOSITION FOR THE CONTROLLED ACCELERATED DECOMPOSITION OF CONDENSATION POLYMERS

CROSS-REFERENCE TO RELATED APPLICATIONS

This patent application is the U.S. national phase of International Application No. PCT/EP2020/000019, filed on Jan. 17, 2020, which claims the benefit of German Patent Application No. 10 2019 200 596.9, filed Jan. 17, 2019, the disclosures of which are incorporated herein by reference in their entireties for all purposes.

The invention relates to the use of a mixture consisting of at least one aliphatic or cycloaliphatic polyol, in particular an alditol or a cyclitol, and at least one organic phosphorus compound as an additive catalyzing under protic conditions as the hydrolysis of condensation polymers (hydrolysis catalyst). The invention further relates to a condensation polymer composition that comprises at least one aliphatic or cycloaliphatic polyol, in particular an alditol and/or a cyclitol, at least one organic phosphorus compound, and at least one condensation polymer and that is free of a compound in accordance with Formula IV as defined below. A further aspect of the invention is a molding compound or a molded part that can be manufactured from the condensation polymer composition in accordance with the invention. Finally, the invention is directed to a method of manufacturing the condensation polymer composition.

Polyesters, for example PET, or polyamides, for example PA 6, are important plastics for packaging and for technical applications. These plastics are provided for long-lasting intended uses. A high stability of the polymers with respect to external influences is therefore desired.

However, the demand for plastics having a comparatively fast degradability has also increased recently. Condensation polymers are suitable to a special degree to satisfy this demand. The reason for this is that condensation polymers can be hydrolytically cleaved into low molecular, short chain fractions having functional groups. The fractions are metabolized by some microorganisms and can thereby be supplied to a natural metabolic cycle.

In addition, the efforts in the sense of sustainable chemistry are directed to polycondensation products increasingly being produced from renewable natural resources. The importance of condensation polymers such as polylactic acid (PLA), poly-3-hydroxybutyrate, poly-3-hydroxyvalerate, poly(butylene succinate) or poly(butylene succinate-co-adipate) is increasing. They replace the oil based plastics more and more frequently and have already established themselves in the packaging industry and in agricultural applications.

Even though the polycondensation products from renewable natural resources have a relatively high degradation rate and can be composted comparatively well in comparison with conventional condensation polymers, there is a need to also further accelerate the degradation of these polymers. At the same time, however, it should be avoided that problems occur in the processing of the raw polycondensate product and that thermal (pre) damage occurs in the production of various plastic parts.

There are already different approaches in the literature both for the degradation acceleration and for the stabilization in production. These approaches are, however, not compatible with one another so that condensation polymer compositions that can be processed into molded parts without thermal damage and that are degraded fast after their intended use were previously not accessible.

Approaches for Degradation Acceleration

The degradation of condensation polymers can be accelerated by special environmental conditions, for example by the use of selected microorganisms (W. Pattanasuttichonlakul et al., International Biodeterioration & Biodegradation, 2018, 132, 74-83) or enzymes (WO 2005/063037 A1). Another possibility is the addition of additives promoting degradation. On the one hand, silica nanoparticles can be named here that are known to effect a photocatalytic degradation (P. Georgiopoulus et al., Journal of Biomaterials Applications, 2014, 29, 662-674). Additives promoting oxidation such as manganese stearate (CN 103408827) can also be considered. A further method of influencing the degradation rate of PLA is the addition of inorganic fillers such as MgO or ZnO (US 2014/0360728 A1) or of organic fillers such as chitosan or keratin (M. A. Elsawy et al., Renewable and Sustainable Energy Reviews 2017, 79, 1346-1352). Blends of PLA and rapidly degradable polymers can furthermore naturally also be produced such as blends of PLA with poly(butylene succinate) (Y. Wang et al., Polym. Bull. 2016, 73, 1067-1083).

The above-mentioned methods for degradation acceleration can, however, either only be used after the use of the plastic parts in accordance with their intended purpose (microorganisms, enzymes) or they bring about other disadvantages. Photocatalytically acting or oxidation promoting additives, for example, change the degradation characteristics of the polymer in principle, whereas the addition of fillers or the preparation of a blend with other polymers results in different mechanical properties of the material.

The degradation of known condensation polymers furthermore often only takes place at particularly low or high pH values since an acid catalyzed or base catalyzed splitting of an ester group has to take place (A. Göpferich, Biomaterials 1996, 17, 103-114). An acid or base environment in processing is, however, counterproductive since great damage to the polymer thereby already takes place.

Approaches for Stabilization

It is known from WO 94/07949 A1 that condensation polymers can be stabilized by means of phosphites. The combination of phosphites with further stabilizers, for example antioxidants, is also customary and is described, for example, in WO 2010/000638 A1. EP 2 558 737 A1 furthermore discloses a condensation polymer composition that comprises a selected phosphite stabilizer and a cyclic polyol.

Further additive combinations are not known in the context described.

It was therefore the object of the present invention to provide a method by which both a stabilization of a condensation polymer in the raw product state and an accelerated degradation of the molded part manufactured therefrom can be implemented after its use in accordance with its intended purpose. It was further the object of the present invention to provide a correspondingly stabilized condensation polymer composition with accelerated degradability.

This object is achieved by the features of the condensation polymer composition, the method by which the condensation polymer composition can be produced, and a molding compound or molded part that can be manufactured from the condensation polymer composition, as described herein. Applications of the condensation polymer composition and other advantageous developments are also described.

The invention thus relates to the use of a mixture consisting of at least one polyol selected from the group comprising aliphatic or cycloaliphatic polyols (A) and at least one organic phosphorus compound (B) as the additive catalyzing the hydrolysis of condensation polymers under protic conditions (hydrolysis catalyst).

A hydrolysis catalyst is understood as a substance mixture that promotes the hydrolytic cleaving of the covalent bonds in the condensation polymer and thereby increases the degradation rate of the condensation polymer by hydrolysis.

The increase of the hydrolytic degradation can be determined e.g., using comparative experiments of polycondensation polymers comprising the described mixture with polycondensation polymers not comprising the described mixture under protic conditions (e.g., in the presence of water). The hydrolytic degradation can, for example, be determined using the melt flow index (e.g., the melt volume flow rate (MVR), determinable in accordance with EN ISO 1133-1:2011), where an increased melt flow index signifies an increased degradation and thus an increased hydrolysis rate.

It was surprisingly able to be found that the hydrolysis rate is greatly increased by incorporating the described mixture into polycondensation polymers when a polycondensation polymer comprising the mixture is exposed to protical hydrolyzing conditions.

The mixture can preferably simultaneously be used as an additive for a polycondensation polymer that is thermally stabilizing under aprotic conditions (e.g., in the absence of moisture).

A thermally stabilizing additive is understood as a substance mixture that reduces the temperature induced degradation of condensation polymers. A reduced degradation is particularly of great importance in the further processing of the raw polymer. On the extrusion of polymer melts in which an unwanted thermal degradation of the respective polymer is almost always observed, a stabilizing additive can be used effectively, for example.

The degree of thermal stabilization can be determined in that the molecular weight, the viscosity, or the melt flow index (e.g., the melt volume flow rate (MVR)) are measured both before and after exposure of the condensation polymer to elevated temperatures. An only small change in the values of said measurands is an indication of a high degree of thermal stabilization.

Aprotic conditions are understood such that only molecules are present that do not have functional groups form which hydrogen atoms can be released as protons. Such conditions occur, for example, in the thermoplastic processing of polycondensation polymers in virtual absence of moisture, in particular thermoplastic polycondensation polymers (in particular during extrusion). In contrast to this, under protic conditions, at least one solvent or another compound is present that releases protons, such as water.

It is completely surprising and not predictable that the same mixture, on the one hand, accelerates a hydrolytic degradation of the polycondensation polymers and, on the other hand, can simultaneously ensure a thermal stabilization of the polycondensation polymers under aprotic conditions.

In a preferred embodiment, the condensation polymer is selected from the group comprising
polyesters of aliphatic or aromatic dicarboxylic acids and diols or of hydrocarboxylic acids such as polylactic acid (PLA), polybutylene succinate, polybutylene succinate-co-adipate, poly(butylene adipate) (PBA), polyethylene terephthalate (PET), polybutylene terephthalate (PBT), polypropylene terephthalate (PPT), polyethylene naphthylate, poly-1,4-dimethylolcyclohexane terephthalate, polyhydroxybenzoate, polyhydroxynaphthalate,
polycarbonates or polyester carbonates;
polyamides such as PA 6, PA 6.6, PA 6.10, PA 4.6, PA 4.10, PA 6.12, PA 10.10, PA 12.12, PA 10.12, PA 11, PA 12;
semiaromatic polyamides such as polypththalamides, e.g., prepared from terephthalic acid and/or isophthalic acid and aliphatic diamines or of aliphatic dicarboxylic acids such as adipic acid or sebacic acid and aromatic diamines such as 1,4- or 1,3-diamine benzol;
and mixtures, combinations, or blends of two or more of the above-named polymers.

The condensation polymer is preferably selected from the group comprising PLA, poly(butylene adipate) (PBA), polycaprolactone (PCL), poly-3-hydroxybutyrate, poly-4-hydroxybutyrate, poly-3-hydroxyvalerate, poly(hexamethylene succinate), poly(butylene succinate) and copolymers such as poly(butylene succinate-co-adipate) and mixtures or blends of two or more of the above-named polymers.

Said polycondensation polymers can be prepared by condensation reactions of alpha, omega functional monomers or of a plurality of difunctional monomers by condensation reactions, e.g., while releasing water using customary technical processes. It is, however, equally possible to synthesize these polymers by ring-opening polymerization; for example, polylactides (polylactic acid) are obtained from lactide by ring-opening ionic polymerization.

The mixture of the at least one polyol selected from the group comprising aliphatic or cycloaliphatic polyols and the at least one organic phosphorus compound as a stabilizer or hydrolysis catalyst for PLA, PBA, and copolymers thereof is advantageously used, where the PLA copolymers were preferably obtained by ring-opening polymerization of D-lactide and/or L-lactide with comonomers selected from hydrocarboxylic acids, in particular glycolic acid, 4-hydroxybutanoic acid, 3-hydroxybutanoic acid, 3-hydroxyvalerianic acid, or mandelic acid, diols, in particular ethylene glycol or butane diol; and/or carboxylic acids, in particular adipic acid, sebacic acid, or terephthalic acid.

If the condensation polymers indicated above are copolymers, they can be present in the form of statistical ("random") block structures or tapered structures.

It is furthermore preferred that the at least one aliphatic or cycloaliphatic polyol (A) is selected from the group comprising polyols having at least four OH groups, preferably alditols and/or cyclitols having at least four OH groups, is in particular selected from the group comprising threite, erythrite, galactite, mannite, ribite, sorbite, xylite, arabite, isomalt, inosite, lactite, maltite, altritol, iditol, maltotriol, pentaerythrite, dipenaerythrite, tripentaerythrite, and mixtures thereof, myo-inosite and sorbite are particularly preferred.

At least one organic phosphorus compound is preferably selected from the group comprising organic phosphites, organic phosphonites, organic phosphonates, or organic phosphates and mixtures and combinations thereof.

The at least one organic phosphite (B) is particularly preferably contained in the mixture; it can e.g., be an easily hydrolizable phosphite such as a phosphite having aliphatic groups. The at least one phosphite is preferably a phosphite having the general formula (I)

(I)

where the substituents $R^1$, $R^2$ and $R^3$ are selected independently of one another from the group comprising optionally substituted $C_4$-$C_{32}$-alkyl-, cycloalkyl- and aryl residues or the substituent $R^1$ is selected from the group comprising optionally substituted $C_4$-$C_{32}$-alkyl, --cycloalkyl- and aryl residues and $R^2$ is connected to $R^3$ to form a cyclic system, in particular a spiro cycle.

Condensation polymer compositions having very good properties are obtained when the at least one organic phosphite (B) in the mixture used has one of the following formulas (II) or (III)

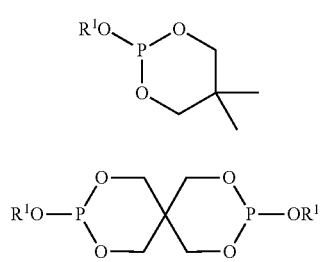

where $R^1$ is selected from optionally substituted $C_4$-$C_{32}$-alkyl-, -cycloalkyl- or aryl residues.

It is further preferred if a mixture is used in which the at least one organic phosphite (B) is selected from the following compounds

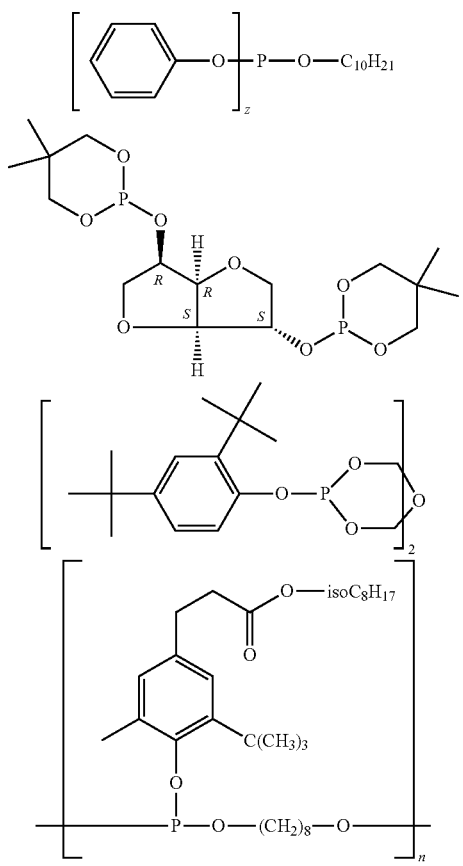

-continued

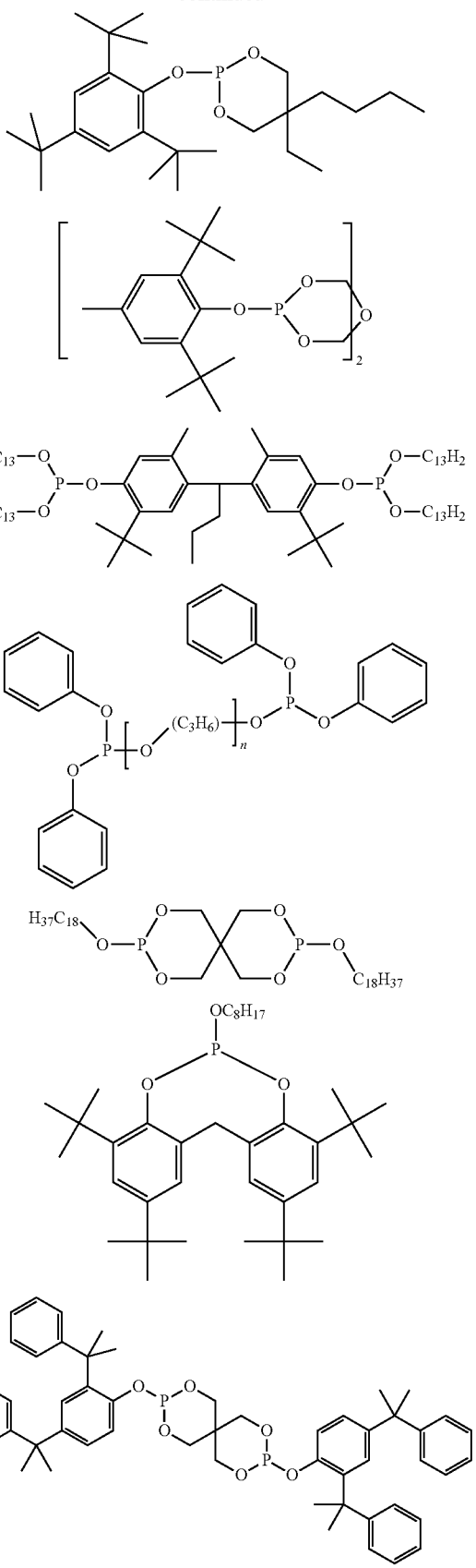

-continued

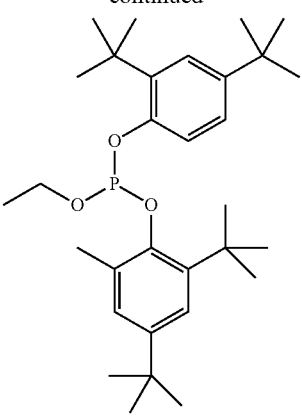

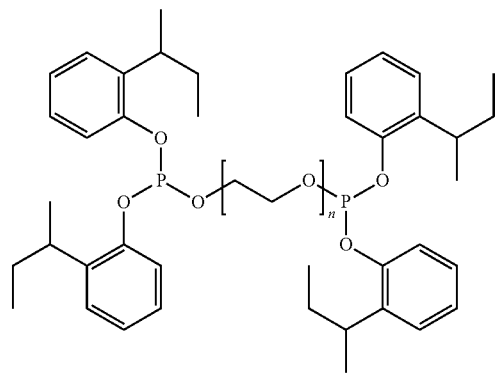

where n=1-100, preferably 2-10 or from the group comprising trilauryl phosphite, triisodecylphosphite, tridecylphosphite, trihexadecylphosphite (tricetylphosphite), trioctadecylphosphite, tribehenylphosphite, triarachidylphosphite, tricerylphosphite, tricetylphosphite, and trioleylphosphite.

Further preferred phosphites comprise one or more benzofuran groups as substituents. These compounds are e.g., available as described in WO 2017/025431 A1. The disclosure of this publication with respect to said benzofuran substituted phosphites is also made the subject of the present patent application. Exemplary phosphites are e.g.

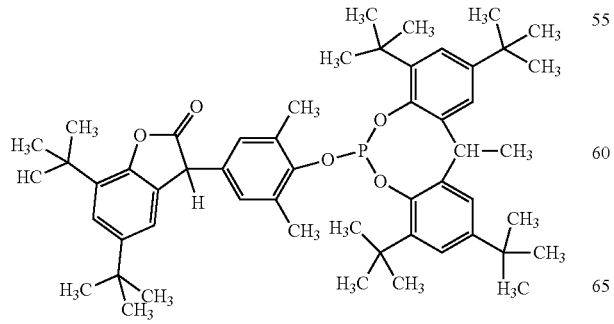

-continued

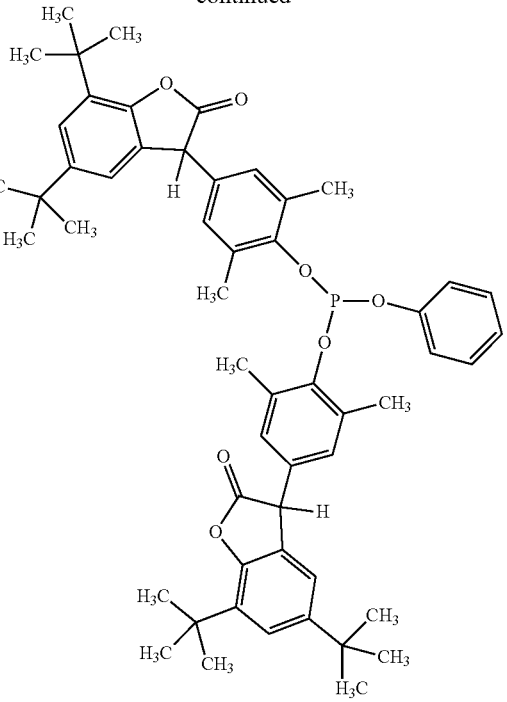

In addition, the at least one organic phosphite (B) is advantageously free of a compound in accordance with formula (IV)

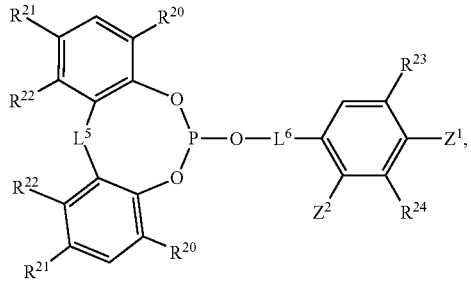

(IV)

where $R^{20}$ and/or $R^{21}$ are, independently of one another on every occurrence, a hydrogen atom, a $C_{1-8}$-alkyl group, a $C_{5-8}$-cycloalkyl group, a $C_{6-12}$-alkylcycloalkyl group, a $C_{7-12}$-aralkyl group, or a phenyl group, $R^{23}$ and $R^{24}$ are, independently of one another on every occurrence, a hydrogen atom, a $C_{1-8}$-alkyl group, a $C_{5-8}$-cycloalkyl group, a $C_{6-12}$-alkylcycloalkyl group, a $C_{7-12}$-aralkyl group, or a phenyl group, $R^{22}$ is a hydrogen atom or an alkyl group on every occurrence, $L^5$ is a single bond, a sulfur atom, or a bivalent group in accordance with the formula (IVa)

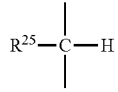

(Iva)

where $R^{25}$ signifies a hydrogen atom, a $C_{1-8}$-alkyl group, or a $C_{5-8}$-cycloalkyl group, $L^6$ is a $C_{2-8}$-alkylene group or a bivalent group in accordance with the formula (IVb)

(IVb)

where $L^7$ is a single bond or a $C_{1-8}$-alkylene group and * represents an oxygen bonding site, and one of $Z^1$ and $Z^2$ is a hydroxyl group, a $C_{1-8}$-alkyl group, a $C_{1-8}$-alkoxy group or a $C_{7-12}$-aralkyloxy group, and the other is a hydrogen atom or a $C_{1-8}$-alkyl group.

This means that the mixture in accordance with the invention is preferably free of the compounds in accordance with the general formula IV.

Preferred phosphates structurally correspond to the above-indicated phosphites and can be obtained, for example, by oxidation of these phosphites to the corresponding phosphate. Preferred phosphates are in particular trilauryl phosphate, triisodecyl phosphate, tridecyl phosphate, trihexadecyl phosphate, trioctadecyl phosphate, tribehenyl phosphate, triarachidyl phosphate, triceryl phosphate, tricety l phosphate, and trioleyl phosphate. Diphosphates and polyphosphates are further suitable. The phosphoric acid underlying the phosphates can also be present in an only partially esterified manner such as monostearyl phosphate or distearyl phosphate or as a mixture of a monoalkyl phosphate, of a dialkyl phosphate, and/or of a trialkyl phosphate.

A preferred phosphonite is:

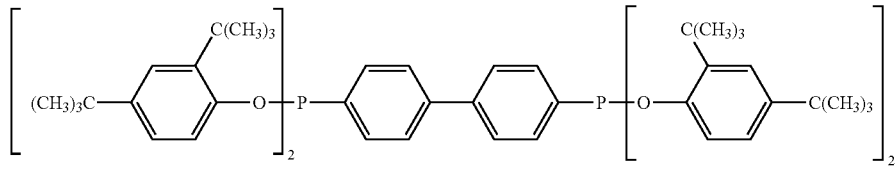

In a preferred embodiment, a mixture is used in which the weight ratio of component (A) to component (B) amounts to from 1:10 to 10:1, preferably from 1:5 to 2:1.

In a second aspect, the present invention relates to a condensation polymer composition comprising or consisting of A) at least one polyol, selected from the group comprising aliphatic or cycloaliphatic polyols, B) at least one organic phosphorus compound, and C) at least one condensation polymer, and that is free of a compound in accordance with the above-defined formula (IV).

Reference is made to the preceding embodiments, which also apply without restriction to the composition, with respect to preferred embodiments relating to the individual components (A) to (C).

It is preferred that the condensation polymer composition comprises or consists of 0.01 to 5.00 parts by weight, preferably 0.05 to 3.00 parts by weight, of at least one polyol, 0.01 to 5.00 parts by weight, preferably 0.05 to 1.00 parts by weight, of at least one organic phosphorus compound, and 90.00 to 99.98 parts by weight, preferably 96.00 to 99.90 parts by weight, of a condensation polymer.

The condensation polymer composition can comprise, in addition to components (A) to (C) at least one additive that is selected from the group comprising primary antioxidants, secondary antioxidants, UV absorbers, light stabilizers, metal deactivators, filler deactivators, antiozonants, nucleation agents, anti-nucleation agents, toughening agents, plasticizers, mold lubricants, rheological modifiers, thixotropic agents, chain extenders, processing aids, mold release agents, flame retardants, pigments, dyes, optical brighteners, antimicrobial active agents, antistatic agents, slip agents, anti-blocking agents, coupling agents, crosslinking agents, anti-cross-linking agents, hydrophilization agents, hydrophobing agents, bonding agents, dispersing agents, compatibilizers, oxygen scavengers, acid scavengers, expanding agents, degradation additives, defoaming agents, odor scavengers, marking agents, anti-fogging agents, fillers, reinforcement materials, and mixtures thereof.

It is equally possible that the condensation polymer composition additionally comprises at least one additional substance that is selected from i) degradation additives, preferably organic transition metal compounds such as transition metal carboxylates, in particular iron (III) stearate and/or manganese (II) stearate;

ii) plasticizers, preferably tributylacetate citrate, tributyl citrate, triethyleacetyl citrate, glycerol triacetate, epoxidized soy bean oil, and/or epoxidizes linseed oil;

iii) nucleation agents, preferably talcum, alkaline salts or alkaline earth salts of monofunctional and polyfunctional carboxylic acids, in particular of benzoic acid, succinic acid, adipic acid, e.g., sodium benzoate and aluminiumhydroxy-bis(4-tert-butyl)benzoate; zinc glycerolate, 2,2'-methylene-bis-(4,6-di-tert-butylphenyl) phosphate, trisamides and diamides such as trimesic acid tricyclohexylamide, trimesic acid tri (4-methylcyclohexylamide), trimesic acid tri (tert-butylamide), N,N',N''-1,3,5-benzoltriyltris(2,2-dimethyl-propanamide), 2,6-naphthalene dicarboxylic acid dicyclohexylamide; and/or orotic acid;

iv) chain extenders, preferably diepoxides, bis-oxazolines, bisoxazolones, bis-oxazines, diisocyanates, dianhydrides, bis-allyl lactams, bis-maleimides, dicyanates, carbodiimides, and/or polymer chain extenders, e.g., polystyrene polyacrylate polyglycidyl(meth)acrylate copolymers, polystyrene maleic acid anhydride copolymers, and polyethylene maleic acid anhydride copolymers;

v) fillers, preferably calcium carbonates, silicates, talcum, mica, kaolins, metal oxides, metal hydroxides, black carbon, graphite, wood flour, fibers of natural products such as cellulose; hydrotalcites, zeolites, and/or phyllosilicates such as montmorillonite, bentonite, beidelite, mica, hectorites, saponite, vermiculite, ledikite, magadite, illite, kaolinite, wollastonite, attapulgite.

The present invention additionally relates to a molding compound or to a molded part that can be produced from the above-described condensation polymer composition. The molding compound or the molded part is in particular selected from injection molded parts, foils, films, bands, hollow bodies, foams, and/or fibers.

A further aspect of the present invention relates to a method of manufacturing the above-described condensation polymer composition in which a mixture consisting of at least one alditol and at least one organic phosphite is introduced into at least one condensation polymer. The mixture is preferably introduced into the condensation polymer in a proportion of at least 0.05 wt %.

The mixture can be introduced into the at least one condensation polymer in that it is first mixed as a solid with the at least one condensation polymer and the mixture resulting from this is subsequently melted in an extruder.

Extruders such as single-screw extruders, twin screw extruders, planetary gear extruders, ring extruders, and co-kneaders that are preferably equipped with a vacuum degassing are preferred as processing machines. The processing can take place here under air or, optionally, under inert gas conditions.

The mixture in accordance with the invention can also be introduced into the at least one condensation polymer in the form of a masterbatch or concentrate that comprises, for example, 20-90% of the mixture in accordance with the invention.

The invention further relates to the use of the above-described condensation polymer composition for the manufacture of packaging, in particular packaging for foods or for cosmetic products; in the pharmaceutical industry, in particular for encapsulating active ingredients and other biologically active substances, in medical technology, in particular for the manufacture of dressing material and surgical suture material; and/or in hygiene products, in particular as a component of disposable diapers, sanitary towels, and tampons; in agricultural applications, in particular for the manufacture of agricultural films such as mulch films, tunnel films, or perforated films.

The present invention will be described in more detail with reference to the following examples, but without intending to restrict the invention to the preferred parameters shown.

Various condensation polymer compositions (VB1-VB4 and B1-B5) were produced.

Luminy L 130 (≤0.5% D-lactic acid in accordance with the certificate, MVR=8.8 cm$^3$/10 min, measured at 190° C./2.16 kg stamped weight) of the company of Corbion was used as PLA. The polymers were dried at 80° C. in a vacuum drying cabinet for at least 16 h before processing.

The compounds listed below were used as the additives:

Ph-a: Songnox 6260 (manufacturer Songwon)

Ph-b: Doverphos S 9228 (manufacturer Dover)

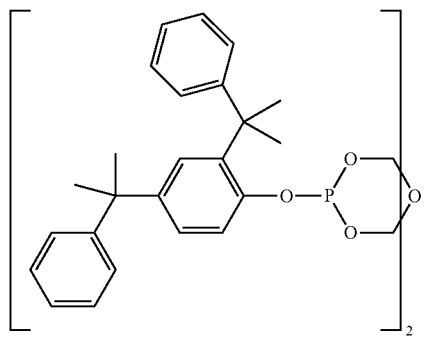

Ph-d: mixture of tristearyl phosphate, distearyl phosphate, and monostearyl phosphate, commercial product ADK Stabl AX 71 of the company Adeka.

Al-a: myo-inosite (a cyclitol)
Al-b: dipentaerythritol (an aliphatic polyol)
Al-c: Erythrite (an alditol)

The manufacture of the condensation polymer compositions (B1-B5) in accordance with the invention and of the comparison examples (VB1-VB4) was accomplished by extrusion using a parallel twin screw extruder "Process 11" of the company Thermo Scientific, having a screw diameter of 11 mm and a length to diameter ratio (LD) of 40.

The additives were manually mixed with the matrix polymer in a plastic bag and were volumetrically metered for the compositions VB2-VB4 and B1-B5. The processing was carried out at a throughput of 1 kg/h and a screw speed of 200 r.p.m. at 200° C.

To check the hydrolysis rate, the polymer was stored in water as pellets at 58° C. and the MVR was determined after 42 or 162 h, respectively. The measurement of the MVR was carried out on a melt index test unit MI-2 of the company Göttfert at a test temperature of 190° C. and a stamp weight of 2.16 kg. The samples were dried for at least 16 h in the vacuum furnace at 80° C. prior to the measurement. The preheating time amounted to 4 minutes. The MVR is indicated in cm$^3$/10 min.

The results of the processing tests are summarized in Table 1 and of the hydrolysis experiments in Table 2.

TABLE 1

Processing stability of PLA compositions

| | Phosphorus compound | | Alditol | | MVR increase in the extrusion (with respect to zero values of comparison trials VB1) |
|---|---|---|---|---|---|
| | Type | Wt. % | Type | Wt. % | (Extrusion) |
| VB1 | — | — | — | — | 0.6 (with respect to MVR starting material 8.8 cm$^3$/10 min, averaged value of 3 trials) |
| VB2 | Ph-a | 0.25 | — | — | 0.9 |
| VB3 | Ph-a | 0.50 | — | — | 1.6 |
| VB4 | Ph-b | 0.50 | — | — | 2.5 |
| VB5 | Ph-d | 0.25 | — | — | 5.2 |
| VB6 | — | — | Al-a | 0.50 | 0.1 |
| VB7 | — | — | Al-b | 0.50 | 1.1 |
| B1 | Ph-a | 0.25 | Al-a | 0.50 | 0.4 |
| B2 | Ph-a | 0.25 | Al-b | 0.50 | 1.6 |
| B3 | Ph-a | 0.50 | Al-a | 0.05 | 0.4 |

TABLE 1-continued

Processing stability of PLA compositions

| | Phosphorus compound | | Alditol | | MVR increase in the extrusion (with respect to zero values of comparison trials VB1) |
|---|---|---|---|---|---|
| | Type | Wt. % | Type | Wt. % | (Extrusion) |
| B4 | Ph-a | 0.50 | Al-c | 0.05 | 0.5 |
| B5 | Ph-b | 0.50 | Al-c | 0.05 | 1.5 |
| B6 | Ph-d | 0.25 | Al-a | 0.50 | 3.6 |

As can be seen from the tests for processing stability, the addition of a phosphite or phosphate results in an increase in the MVR, that is to an unwanted degradation of the polymer. This degradation during processing can be reduced by the combination in accordance with the invention.

TABLE 2

Water storage of PLA compositions

| | Phosphorus compound | | Alditol | | MVR increase after water storage at 42 h. | MVR increase after water storage at 162 h |
|---|---|---|---|---|---|---|
| | Type | Wt. % | Type | Wt. % | | |
| VB1 | — | — | — | — | 11 | ND |
| VB2 | Ph-a | 0.25 | — | — | 24 | ND |
| VB3 | Ph-a | 0.50 | | | ND | ND |
| VB4 | Ph-b | 0.50 | — | — | 31 [[h]] (47 h) | ND |
| VB5 | Ph-d | 0.25 | | | 26 | ND |
| VB6 | — | — | Al-a | 0.50 | 7.6 | 124 |
| VB7 | | | Al-b | 0.50 | 9.6 | 85 |
| B1 | Ph-a | 0.25 | Al-a | 0.50 | 24 | 128 |
| B2 | Ph-a | 0.25 | Al-b | 0.50 | 26 | 176 |
| B3 | Ph-a | 0.50 | Al-a | 0.05 | 36 [[h]] (47 h) | ND |
| B4 | Ph-a | 0.50 | Al-c | 0.05 | 42 [[h]] (47 h) | ND |
| B5 | Ph-b | 0.50 | Al-c | 0.05 | 32 [[h]] (47 h) | ND |
| B6 | Ph-d | 0.25 | Al-a | 0.50 | 28 | 320 |

ND = Not determined

A degradation of the polymer occurs during water storage starting from a higher molecular weight (lower MVR) due to the improved processing stability of the compositions in accordance with the invention. It should thus be assumed that the degradation during water storage is also delayed (which is documented by the sole addition of alditols) since a higher number of chain scissions is required for a specific lower molecular weight. The degradation is surprisingly not delayed by the compositions in accordance with the invention, but rather remains at least the same or is even accelerated.

In a further series of experiments, Luminy L 175 (≤0.5% D-lactic acid in accordance with the certificate, MVR=4.7 cm³/10 min, measured at 190° C./2.16 kg stamp weight) supplied by Corbion was used as PLA.

Ph-c: Weston 618F (Supplier: SI Group)

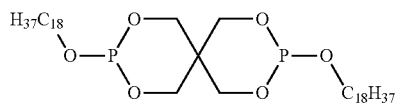

Ph-d: Adekastab AX-71 (see above)
Al-d: sorbite (an alditol)

The results of the processing tests and of the hydrolysis tests are summarized in Table 3.

TABLE 3

| | Phosphorus compound | | Alditol | | MVR [190/2.16] after extrusion | MVR [190/2.16] after water storage at 48 h | MVR [190/2.16] after water storage at 96 h | MVR [190/2.16] after water storage at 168 h |
|---|---|---|---|---|---|---|---|---|
| | Type | Wt. % | Type | Wt. % | | | | |
| VB8 | — | — | — | — | 6.0 | 14.9 | 26 | 69 |
| C1 | Ph-d | 0.1 | Al-d | 0.40 | 6.4 | 17 | 39 | 12 |
| C2 | Ph-d | 0.25 | Al-d | 0.25 | 7.6 | 22 | 35 | 145 |
| C3 | Ph-d | 0.40 | Al-d | 0.10 | 6.8 | 24 | 58 | 230 |
| C4 | Ph-c | 0.1 | Al-d | 0.4 | 6.1 | 19 | 35 | 89 |
| C5 | Ph-c | 0.25 | Al-d | 0.25 | 6.3 | 28 | 57 | 210 |
| C6 | Ph-c | 0.4 | Al-d | 0.1 | 6.8 | 41 | 105 | >>300 |

The compositions in accordance with the invention only show a small increase of the MVR value after extrusion and an accelerated degradation during water storage, documented by a higher MVR value, i.e., a lower molecular weight, in comparison with the test without additive. The acceleration of the degradation can be monitored and set by the ratio of polyol and phosphorus, with a higher proportion of polyol contributing to the processing stability and a higher proportion of a phosphorus component contributing to the accelerated degradation.

The invention claimed is:

1. A method of catalyzing hydrolysis of a condensation polymer comprising adding a mixture consisting of
   (A) at least one polyol selected from the group comprising aliphatic or cycloaliphatic polyols and
   (B) at least one organic phosphorus compound
to the condensation polymer to form a condensation polymer composition comprising said mixture and said condensation polymer and exposing said condensation polymer composition to water; wherein the condensation polymer composition is exposed to water only after the addition of the mixture consisting of components (A) and (B);
   wherein said mixture thermally stabilizes the condensation polymer in the absence of water.

2. The method of claim 1, wherein the condensation polymer is selected from the group consisting of polyesters of aliphatic or aromatic dicarboxylic acids and diols or of hydroxycarboxylic acids, polycarbonates, polyester carbonates, polyamides, semi aromatic polyamides, and mixtures, combinations, or blends of two or more of the above-named polymers.

3. The method of claim 1, wherein the condensation polymer is selected from the group consisting of PLA, poly(butylene adipate) (PBA), polycaprolactone (PCL), poly-3-hydroxybutyrate, poly-4-hydroxybutyrate, poly-3-hydroxyvalerate, poly(hexamethylene succinate), poly(butylene succinate) and copolymers and mixtures or blends of two or more of the above-named polymers.

4. The method of claim 3, wherein the condensation polymer is selected from the group consisting of PLA, PBA, and copolymers thereof.

5. The method of claim 4, wherein the PLA copolymers are obtained by ring-opening polymerization of D-lactide and/or L-lactide with comonomers selected from hydroxycarboxylic acids, diols, and/or carboxylic acids.

6. The method of claim 1, wherein the at least one aliphatic or cycloaliphatic polyol is selected from the group consisting of polyols having at least four OH groups.

7. The method of claim 1, wherein the at least one organic phosphorus compound is selected from the group consisting of organic phosphites, organic phosphonites, organic phosphonates, and organic phosphates.

8. The method of claim 7, wherein the organic phosphite is a hydrolyzable phosphite having the general formula I

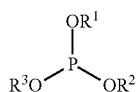
(I)

wherein
(i) $R^1$, $R^2$ and $R^3$ are selected independently of one another from the group consisting of optionally substituted $C_4$-$C_{32}$-alkyl-, cycloalkyl- and aryl residues, or
(ii) $R^1$ is selected from the group consisting of optionally substituted $C_4$-$C_{32}$-alkyl-, cycloalkyl- and aryl residues and $R^2$ is connected to $R^3$ to form a cyclic system.

9. The method of claim 7, wherein the organic phosphite has one of the following formulas (II) or (III),

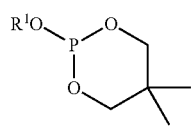
(II)

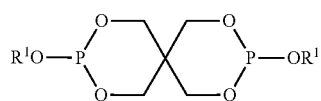
(III)

wherein $R^1$ is selected from optionally substituted $C_4$-$C_{32}$-alkyl-, -cycloalkyl-, and aryl residues.

10. The method of claim 7, wherein the organic phosphite is selected from the following compounds

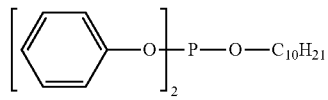

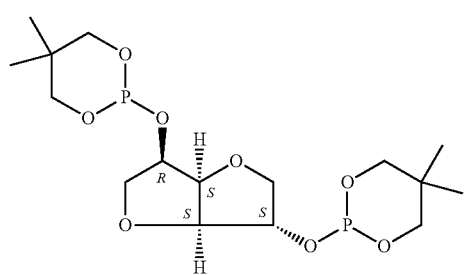

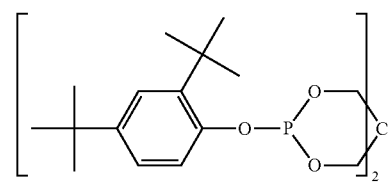

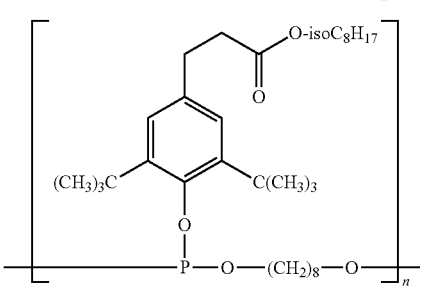

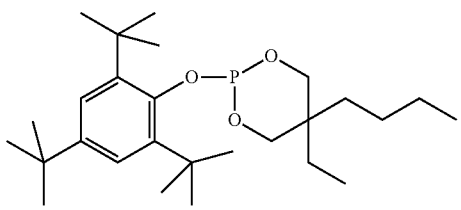

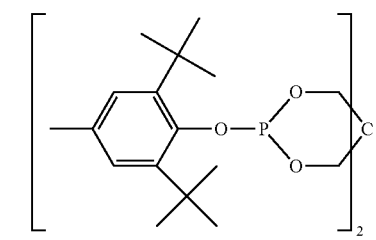

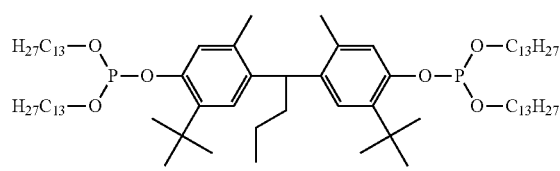

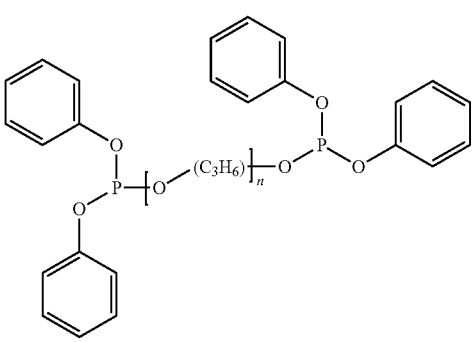

-continued

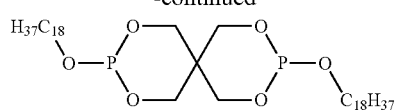

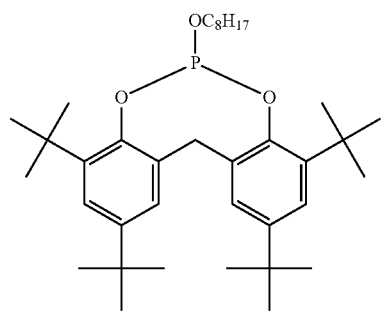

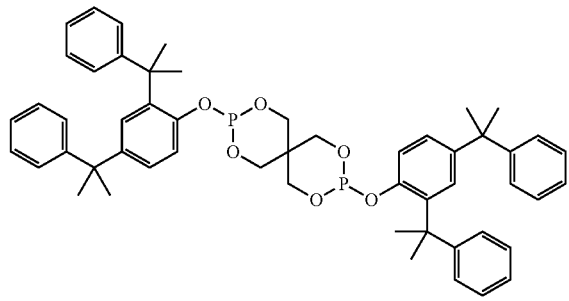

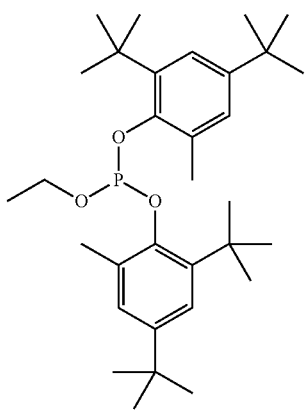

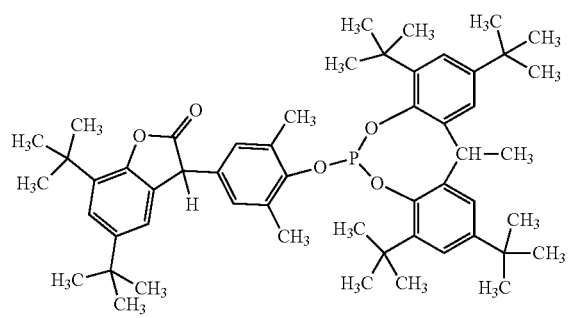

-continued

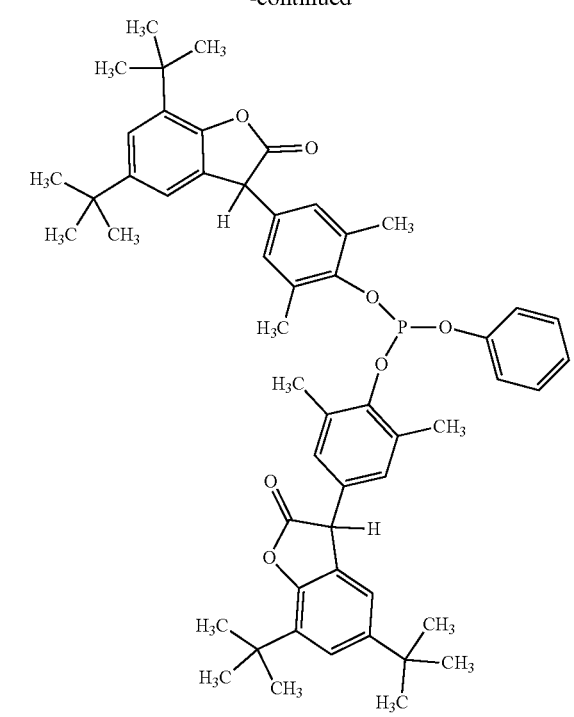

in which n=1-100, or from the group consisting of trilauryl phosphite, triisodecylphosphite, tridecylphosphite, trihexadecylphosphite, trioctadecylphosphite, tribehenylphosphite, triarachidylphosphite, tricerylphosphite, tricetylphosphite, and trioleylphosphite.

11. The method of claim 7, wherein the organic phosphite is free of a compound in accordance with formula (IV)

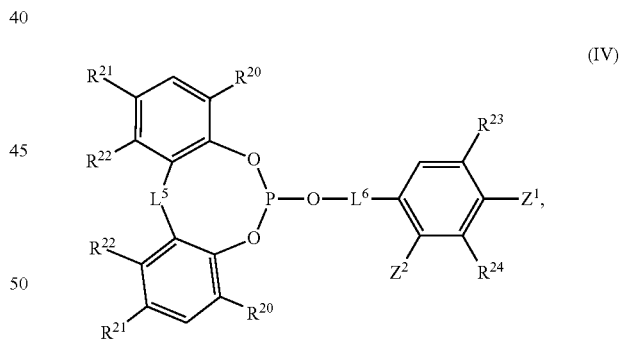

(IV)

wherein $R^{20}$ and/or $R^{21}$ are, independently of one another on every occurrence, a hydrogen atom, a $C_{1-8}$-alkyl group, a $C_{5-8}$-cycloalkyl group, a $C_{6-12}$-alkylcycloalkyl group, a $C_{7-12}$-aralkyl group, or a phenyl group, $R^{23}$ and $R^{24}$ are, independently of one another on every occurrence, a hydrogen atom, a $C_{1-8}$-alkyl group, a $C_{5-8}$-cycloalkyl group, a $C_{6-12}$-alkylcycloalkyl group, a $C_{7-12}$-aralkyl group, or a phenyl group, $R^{22}$ is a hydrogen atom or an alkyl group on every occurrence, $L^5$ is a single bond, a sulfur atom, or a bivalent group in accordance with the formula (IVa)

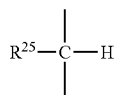
(IVa)

where $R^{25}$ signifies a hydrogen atom, a $C_{1-8}$-alkyl group, or a $C_{5-8}$-cycloalkyl group, $L^6$ is a $C_{2-8}$-alkylene group or a bivalent group in accordance with the formula (IVb)

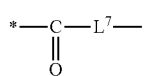
(IVb)

where $L^7$ is a single bond or a $C_{1-8}$-alkylene group and * represents an oxygen bonding site, and one of $Z^1$ and $Z^2$ is a hydroxyl group, a $C_{1-8}$-alkyl group, a $C_{1-8}$-alkoxy group or a $C_{7-12}$-aralkyloxy group, and the other is a hydrogen atom or a $C_{1-8}$-alkyl group.

12. The method of claim 7, wherein the organic phosphate is selected from the group consisting of trilauryl phosphate, triisodecyl phosphate, tridecyl phosphate, trihexadecyl phosphate, trioctadecyl phosphate, tribehenyl phosphate, triarachidyl phosphate, triceryl phosphate, tricetyl phosphate, trioleyl phosphate, diphosphates, polyphosphates, monostearyl phosphate, distearyl phosphate, and mixtures of a monoalkyl phosphate, of a dialkyl phosphate and of a trialkyl phosphate.

13. The method of claim 1, wherein the weight ratio of component (A) to component (B) is from 1:10 to 10:1.

* * * * *